(12) United States Patent
Kalkunte et al.

(10) Patent No.: US 9,054,982 B2
(45) Date of Patent: Jun. 9, 2015

(54) SATELLITE CONTROLLING BRIDGE ARCHITECTURE

(71) Applicant: Broadcom Corporation, Irvine, CA (US)

(72) Inventors: Mohan Kalkunte, Saratoga, CA (US); Nicholas Kucharewski, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 139 days.

(21) Appl. No.: 13/734,377

(22) Filed: Jan. 4, 2013

(65) Prior Publication Data

US 2014/0177641 A1 Jun. 26, 2014

Related U.S. Application Data

(60) Provisional application No. 61/740,945, filed on Dec. 21, 2012.

(51) Int. Cl.
*H04L 12/933* (2013.01)
*H04L 12/701* (2013.01)
*H04L 12/46* (2006.01)

(52) U.S. Cl.
CPC ............ *H04L 49/15* (2013.01); *H04L 45/00* (2013.01); *H04L 12/4625* (2013.01)

(58) Field of Classification Search
CPC .............................. H04L 49/15; H04L 45/00
USPC ............................ 370/401, 392, 389, 390
See application file for complete search history.

(56) References Cited

U.S. PATENT DOCUMENTS

| 7,389,359 | B2 * | 6/2008 | Jain et al. | 709/238 |
| 7,729,291 | B2 * | 6/2010 | Heino et al. | 370/254 |
| 2012/0287930 | A1 * | 11/2012 | Raman | 370/392 |

* cited by examiner

*Primary Examiner* — Mohammad Anwar
(74) *Attorney, Agent, or Firm* — Brinks Gilson & Lione

(57) ABSTRACT

A system and a method include a port extender communicatively linked to a controlling bridge. Network data is received from a local network peer downstream to the port extender. Whether a destination of the network data is a recognized downstream network peer of the port extender is determined. The network data is selectively routed according to whether the destination of the network data is a recognized downstream network peer of the port extender.

20 Claims, 7 Drawing Sheets

SATELLITE CONTROLLING BRIDGE ARCHITECTURE

CROSS REFERENCE TO RELATED APPLICATIONS

This application claims the benefit of priority to the following U.S. Provisional Application Ser. No. 61/740,945, entitled "Satellite Controlling Bridge Architecture," filed on Dec. 21, 2012, the contents of which are hereby incorporated herein by reference in its entirety.

TECHNICAL FIELD

This disclosure relates to controlling bridges. This disclosure also relates to satellite controlling bridge architectures.

BACKGROUND

Advances in electronics and communication technologies are resulting in communication networks linking an increasingly large number of network devices. Network peers part of a communication network may exchange data across a multitude of peers, increasing the routing capability, processing requirements, and complexity of network devices managing the communication network. Technology can continue to advance and communication networks grow in size, frequency of use, complexity and capability.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to a satellite controlling bridge. A satellite controlling bridge may be communicatively linked to an upstream controlling bridge and one or more downstream network peers. The satellite controlling bridge receives network data from a network peer downstream to the satellite controlling bridge and determines whether the destination of the network data is a recognized downstream network peer of the satellite controlling bridge. The satellite controlling bridge may selectively route the network data according to whether the destination of the network data is a recognized downstream network peer. When the destination of the network data is a recognized downstream network peer, the satellite controlling bridge sends the network data to the recognized downstream network without forwarding the network data to the upstream controlling bridge. When the destination of the network data is not a recognized downstream network peer, the satellite controlling bridge forwards the network data to the controlling bridge for routing to the destination.

Figure 1:
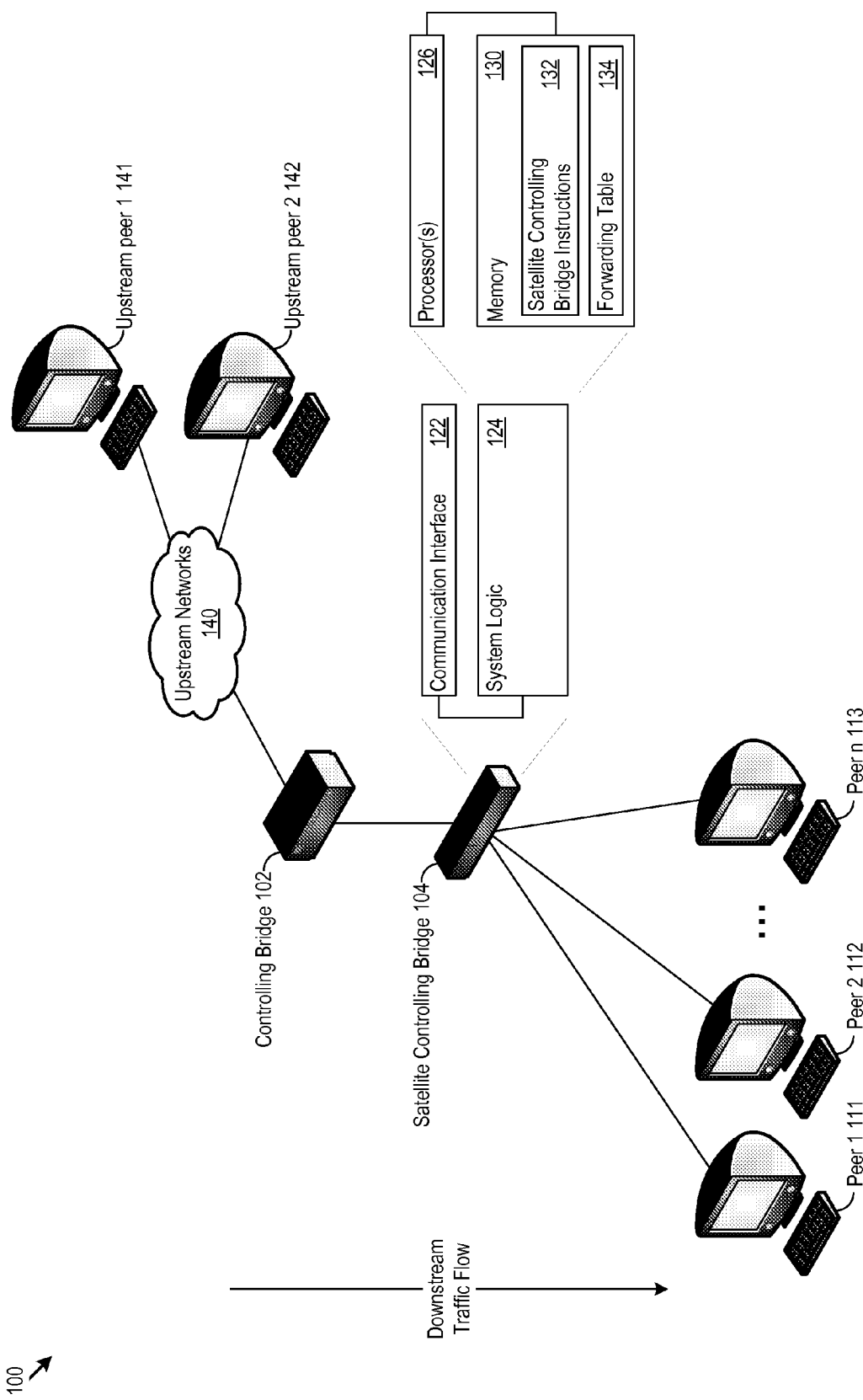
FIG. 1 shows an example of a communication network that includes satellite controlling bridge architecture.

FIG. 1 shows an example of a communication network 100 that includes satellite controlling bridge architecture. The communication network 100 in FIG. 1 includes a controlling bridge 102, a satellite controlling bridge 104, and multiple network peers, including the network peers labeled as peer 1 111, peer 2 112 and peer n 113. The communication network 100 may implement a local area network (LAN) according to any number of communication devices, protocols, topologies, standards, etc. The communication network 100 may be one of multiple network segments included within an aggregate network, such as a Bridged LAN or Virtual Bridged LAN. A Bridged LAN or Virtual Bridged LAN may refer a concatenation of individual LANs or network segments interconnected by bridging network devices. As one example, the communication network 100 implements a network segment of an Ethernet VLAN, such as an L2 data center network with multiple network segments interconnected through associated controlling bridges. The discussion and examples below refer to an exemplary aggregate network implemented as a VLAN, which may be a Virtual Bridged LAN interconnecting multiple network segments or individual LANs. However the satellite controlling bridge architecture presented below may apply to any type of aggregate, bridged, or tunneled communication network.

The communication network 100 may include a bridging architecture, which may refer to any logic that implements network bridging functionality in the communication network 100. Elements of a bridging architecture may include a controlling bridge, port extenders, or other network devices. A satellite controlling bridging architecture may refer to a bridging architecture that includes a satellite controlling bridge, as discussed in greater detail below.

The controlling bridge 102 may support network bridging in a VLAN, and accordingly interconnect network peers in the communication network 100 with other LANs or network segments in the VLAN. The controlling bridge 102 may be associated with a particular network segment, such as the communication network 100. In that regard, the controlling bridge 102 may process and route network traffic to and from network peers of the communication network 100. Examples of a controlling bridge 102 include a Media Access Control (MAC) Bridge or a Bridge implemented according to IEEE standard 802.1 Q, e.g., Clause 5. The controlling bridge 102 may support any number of network bridging protocols, methods, and technologies, including as examples, Audio/Video Bridging, Shortest Path Bridging, transparent bridging, multiport bridging, and more.

The controlling bridge 102 may manage any number of network peers downstream to the controlling bridge 102, including downstream end-point devices such as peer 1 111, peer 2 112, and peer n 113 in FIG. 1. The controlling bridge 102 may manage virtual entities as network peers, e.g., one or more virtual machines executing on a single physical device in the communication network 100. Any number of intermediate network devices may also be associated with, e.g., downstream to, the controlling bridge 102. Examples include port extenders devices, such as port extenders as set forth in IEEE standards 802.1 Qbh and/or 802.1BR. The communication network 100, and its bridging architecture, may include access port extenders, through which end-point devices access a bridging architecture. The communication network 100 may also include transit port extenders, which may refer to intermediate port extending devices linking the controlling bridge 102 to one or more access port extenders in the bridging architecture of the communication network 100. The controlling bridge 102 of a communication network 100 may also be referred to as a master controlling bridge.

The communication network 100 includes the satellite controlling bridge 104. The satellite controlling bridge 104 may include a communication interface 122 and system logic 124. The system logic 124 may implement any functionality associated with the satellite controlling bridge 104, including any of the logic, functionality, or processes discussed below. In one example, the system logic 124 includes one or more processors 126 in communication with a memory 130. The memory may store satellite controlling bridge instructions 132 executable by the processor and a forwarding table 134. The forwarding table 134 may specify recognized downstream network peers of the satellite controlling bridge 104. As discussed in greater detail below, the satellite controlling bridge 104 may selectively route network data sent from a downstream peer according to whether the destination of the network data is a downstream network peer recognized by the satellite controlling bridge 104. More specifically, the satellite controlling bridge 104 may forward the network data to the controlling bridge for routing to a destination when the destination of the network data is not a recognized downstream network peer. When the destination of the network data is a recognized downstream network peer, the satellite controlling bridge 104 may send the network data to the recognized downstream network peer.

In one example, the satellite controlling bridge 104 may be implemented as part of a port extender device, such as an access port extender or transit port extender in the communication network 100. In a port extender device, the satellite controlling bridge 104 may alter how the port extender would otherwise handle certain network traffic, including network traffic sent from a downstream peer for delivery to another downstream peer.

The controlling bridge 102, satellite controlling bridge 104, and other downstream network peers may be communicatively linked to other upstream networks 140 including, as examples, upstream peer 1 141 and upstream peer 2 142 in FIG. 1. The upstream networks 140 may include any intermediate networking devices, such as routers, other controlling bridges, other satellite controlling bridges, port extenders, switches, blades, servers, etc. The upstream networks 140 may include internal networks of the VLAN, such as other portions or segments of the VLAN. Different network segments of the VLAN may be managed by a respective master controlling bridge and any number of satellite controlling bridges as well. The upstream networks 140 may include external networks of the VLAN, such as different physical and/or virtual networks.

Several examples of how data is communicated through a satellite controlling bridge architecture are presented next.

Figure 2:
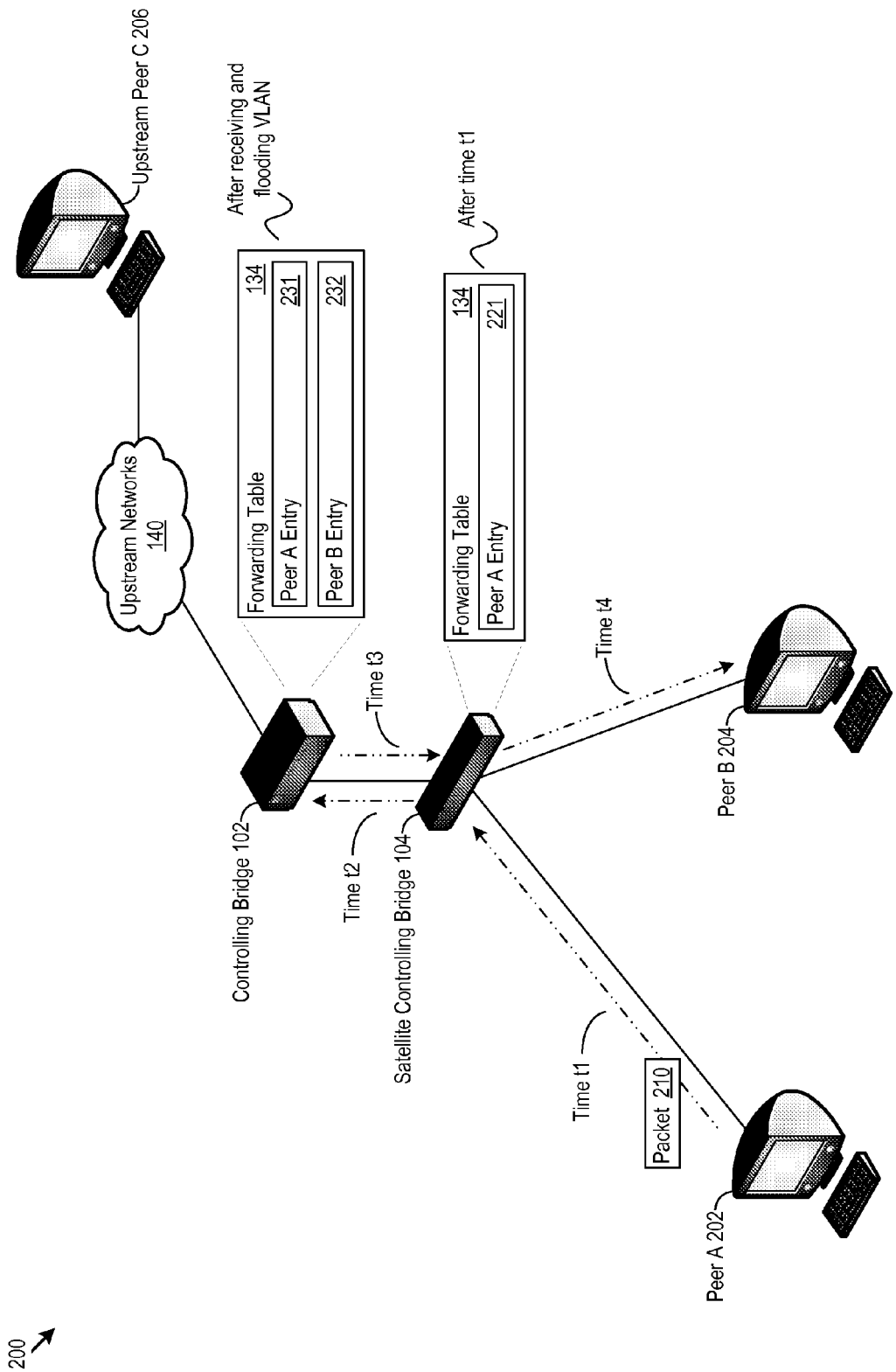
FIG. 2 shows an example of communicating data through a satellite controlling bridge architecture.

FIG. 2 shows an example 200 of communicating data through a satellite controlling bridge architecture. The example 200 includes network peer A 202 and network peer B 204, both of which are downstream to the satellite controlling bridge 104 and the controlling bridge 102. The example 200 also includes the upstream network peer C 206 which is upstream to the controlling bridge 102, the satellite controlling bridge 104, and the network peers A 202 and B 204.

The controlling bridge 102 and satellite controlling bridge 104 may each maintain a forwarding table 134. The forwarding table 134 may share any number of commonalities with a forwarding table, and store entries identifying downstream network peers, upstream network peers, or both. An entry in the forwarding table 134 may include any routing information associated with the network peer and may specify whether the peer entry corresponds to a downstream peer or an upstream peer. For example, an entry may include peer identifying information, e.g., via a MAC address, IP address, device number, or through other identification means. The entry may also include information regarding the communication route through the controlling bridge 102 or satellite controlling bridge 104 respectively receives data from a network peer. Such routing information may identify one or more intermediate network devices, such as an access port extender, transit port extenders, or others, as well as port information with respect to the intermediate network devices.

The satellite controlling bridge 104 may maintain a forwarding table 134 in various ways. As one example, the satellite controlling bridge 104 may add an entry to the forwarding table 134 in response to receiving data sent from a network peer. In that regard, the satellite controlling bridge 104 may learn or identify a recognized network peer when the network peer sends data that reaches the satellite controlling bridge 104. The satellite controlling bridge 104 may, for instance, inspect the packet 210 to determine the source of the packet 210. In the example 200, peer A 202 sends a packet 210 for deliver to peer B 204 at a time t1. The satellite controlling bridge 104 receives the packet 210 from downstream network peer A 202. In response, the satellite controlling bridge 104 identifies peer A 202 as a recognized downstream network peer, e.g., upon inspecting a source filed in header data of the packet 210 and identifying peer A 202. In FIG. 2, after time t1 and in response to receiving the packet 210 from network peer A 202, the satellite controlling bridge 104 adds the entry labeled as peer A entry 221 to its forwarding table 134.

The satellite controlling bridge 104 determines a destination for the packet 210. For instance, the satellite controlling bridge 104 may inspect header data in the packet 210 to identify a destination field. In FIG. 2, the packet 210 specifies peer B 204 as the destination of the packet 210. The satellite controlling bridge 104 determines whether the destination of the packet 210 is a recognized downstream network peer, for example by accessing its forwarding table 134 and performing a lookup for peer B 204. In this example, the satellite controlling bridge 104 will not identify peer B 204 as a recognized downstream peer because the forwarding table 134 of the satellite controlling bridge 104 does not include a corresponding entry for peer B 204.

When the destination of network data is an unrecognized downstream network peer, the satellite controlling bridge 104 forwards the network data to the controlling bridge 102 for subsequent routing. At a time t2 in the example 200, the satellite controlling bridge 104 sends the packet 210 to the controlling bridge 102 for subsequent routing. Thus, in certain circumstances, the satellite controlling bridge 104 may forward network data to the controlling bridge 102 for routing even though the destination of the network data is a downstream network peer of the satellite controlling bridge 104.

The controlling bridge 102 may route the packet 210. The controlling bridge 102 may identify peer A 202 as a recognized downstream peer in response to receiving the packet 210, e.g., by adding an entry corresponding to peer A 202 in its forwarding table 134, seen as the entry labeled peer A entry 231. The controlling bridge 102 may also determine the destination of the packet 210, and perform a lookup in its forwarding table 134 for the determined destination. When the controlling bridge 102 recognizes the destination, the controlling bridge 102 may route the packet 102 to the destination according to the routing information of the destination stored in the forwarding table 134 of the controlling bridge 102.

When the controlling bridge 102 does not recognize the destination, the controlling bridge 102 may flood the VLAN, e.g. with a querying communication regarding the destination, to determine whether the destination is part of the VLAN. The controlling bridge 102 may flood a selected portion the VLAN, for example in a downstream direction, an upstream direction, or both. If the controlling bridge 102 receives a response to the VLAN flooding, the controlling bridge 102 may learn the destination, e.g., by adding an entry into its forwarding table 134. In the example in FIG. 2, the controlling bridge 102 floods the VLAN to query the destination of the packet 210, e.g., peer B 204, in located in the VLAN. The controlling bridge 102 receives a response from peer B 204, and in response, adds an entry for peer B 204 into its forwarding table 134. Thus, after receiving packet 210 and flooding the VLAN, the forwarding table 134 of the controlling bridge 102 includes the peer A entry 231 and the peer B entry 232.

At a time t3, the controlling bridge 102 may route the packet for delivery to Peer B 204. To do so, the controlling bridge 102 may append routing information into the packet 204 indicating routing instructions to one or more intermediate downstream devices to the controlling bridge 102, such as the satellite controlling bridge 104. Examples of appended routing information may include the E-tag as specified by IEEE standard 802.11 Qbh or a HiGig header as specified by the HiGig communication protocol developed by Broadcom Corporation of Irvine, Calif. The satellite controlling bridge 104 receives the packet 210 and, at time t4, the satellite controlling bridge 104 routes the packet for delivery to peer B 204, e.g., according to the routing information appended by the controlling bridge 102.

The satellite controlling bridge 104 may maintain a forwarding table 134 that includes any number or type of devices. In one example, the satellite controlling bridge 104 maintains a forwarding table 134 without entries corresponding to network peers that are upstream to the satellite controlling bridge 104. The satellite controlling bridge 104 may be configured to add entries to its forwarding table 134 corresponding to devices downstream to the satellite controlling bridge 104, but forego adding entries to its forwarding table 134 corresponding to devices upstream to the satellite controlling bridge 104. In this example, the satellite controlling bridge 104 may identify a recognized network peer when the satellite controlling bridge 104 receives network traffic or data from a downstream network device. Accordingly, the satellite controlling bridge 104 may add entries to its forwarding table 134 that correspond to downstream network peers of the satellite controlling bridge 104 without adding entries corresponding to upstream network peers.

Figure 3:
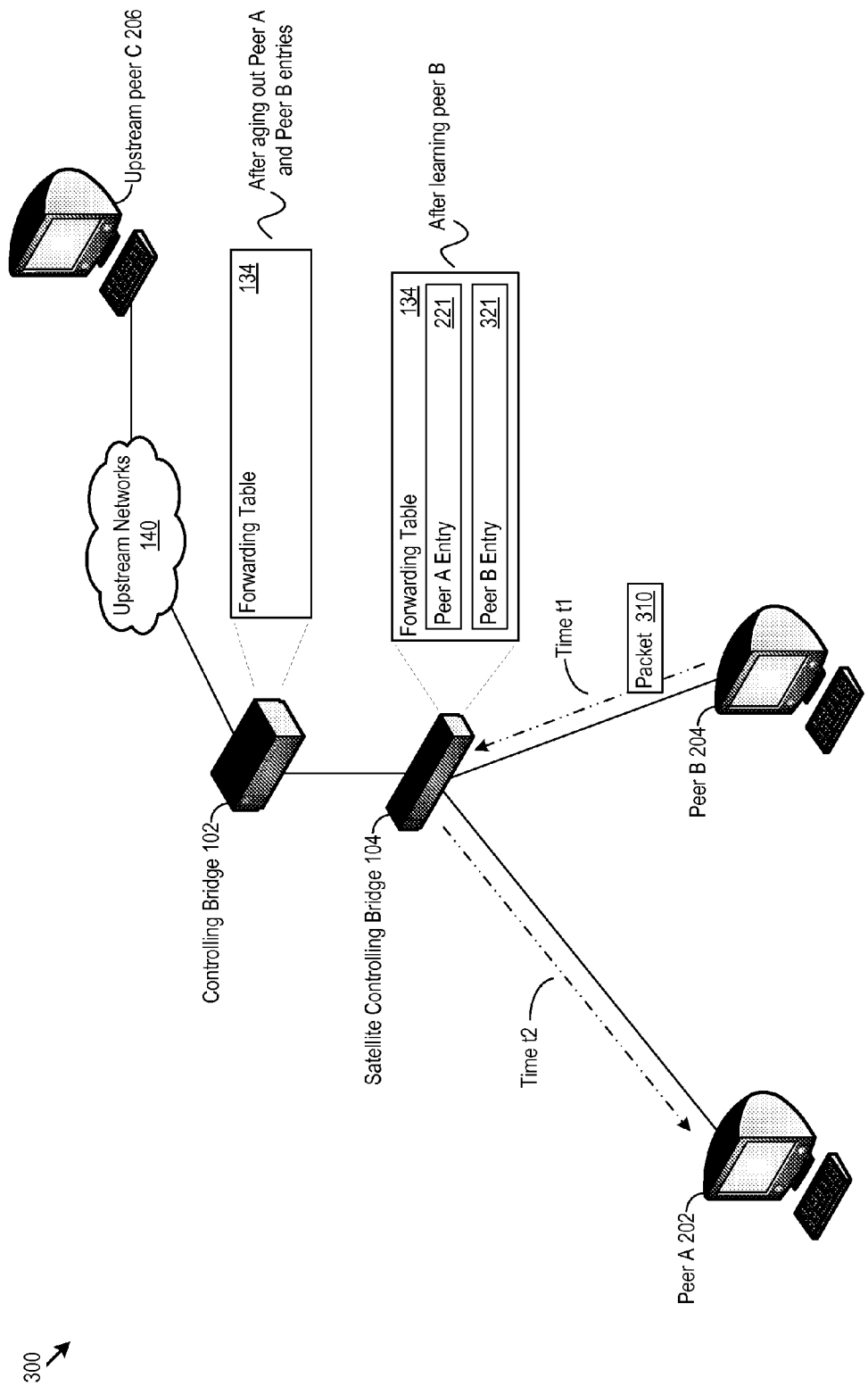
FIG. 3 shows an example of communicating data through a satellite controlling bridge architecture.

FIG. 3 shows an example 300 of communicating data through a satellite controlling bridge architecture, which may occur after the example 200 in FIG. 2. At a time t1, network peer B 204 sends a packet 310 for delivery to network peer A 202. For instance, network peer B 204 may send the packet 310 in response to receiving the packet 210 from network peer A 202. The satellite controlling bridge 104 receives the packet 310 sent from network peer B 204 and identifies network peer B 204 as a recognized network peer, e.g., in any of the ways discussed above. Subsequent to learning network peer B 204, the forwarding table 134 of the satellite controlling bridge 104 includes the peer A entry 221, which the satellite controlling bridge 104 previously added, and the peer B entry 321.

The satellite controlling bridge 104 determines a destination for the packet 310, which in this example is network peer A 202. The satellite controlling bridge 104 then determines whether the destination is a recognized downstream network peer. In that regard, the satellite controlling bridge 104 performs a lookup in its forwarding table 134 for network peer A 202. Upon identifying network peer A 202 as a recognized downstream network peer, the satellite controlling bridge 104 sends the packet 310 to network peer A 202 at time t2. In this way, the satellite controlling bridge 104 may route the packet 310 for delivery without forwarding the packet 310 to the controlling bridge 102. As part of the routing process, the satellite controlling bridge 104 may append routing information to the packet 310, such as an E-tag or HiGig header and forward the packet 310 accordingly.

After learning network peer A 202 and network peer B 204, the satellite controlling bridge 104 may route network data exchanged between network peer A 202 and network peer B 204 without forwarding the network data to the controlling bridge 102. Accordingly, the satellite controlling bridge 104 may reduce the routing, switching, processing, or other computational load of the controlling bridge 102 by selectively routing network traffic exchanged between network devices downstream to the satellite controlling bridge 104.

By selectively routing network traffic between recognized downstream network devices, the satellite controlling bridge 104 may also effectively reduce the size of the forwarding table 134 of the controlling bridge 102. The controlling bridge 102 may maintain its forwarding table 134 according to an aging process to remove entries. The controlling bridge 102 may remove a particular network peer entry from its forwarding table 134 when the controlling bridge 102 does not receive traffic sent from or for delivery to a particular network peer for longer than a determined time threshold. Thus, in FIG. 3, the controlling bridge 102 may age out the peer A entry 231 and peer B entry 231 from its forwarding table 134, e.g., as a result of routing performed by the satellite controlling bridge 104. The satellite controlling bridge 104 may employ a similar aging process to maintain its forwarding table 134 as well.

Figure 4:
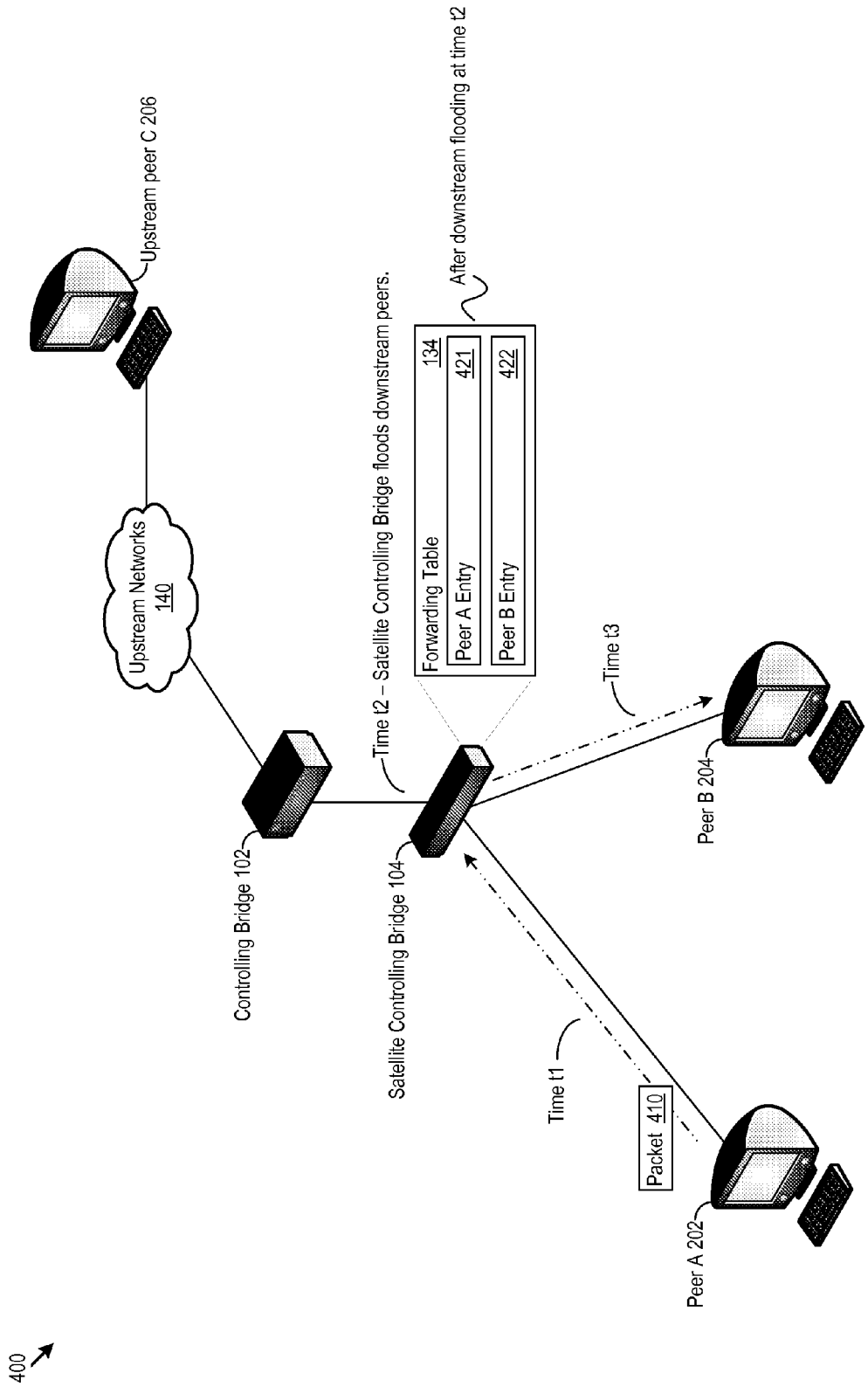
FIG. 4 shows an example of communicating data through a satellite controlling bridge architecture.

FIG. 4 shows an example 400 of communicating data through a satellite controlling bridge architecture. At a time t1, network peer A 202 sends a packet 410 for delivery to peer B 204. Prior to time t1 in this particular example, the satellite controlling bridge 104 does not identify network peer A 202 and network peer B 204 as recognized downstream network peers. For instance, prior to time t1, the forwarding table 134 of the satellite controlling bridge 104 does not include an entry for either network peer A 202 or network peer B 204.

Upon receiving the packet 410, the satellite controlling bridge 104 identifies network peer A 202 as a recognized network peer, and adds the peer A entry 421 into its forwarding table 134. The satellite controlling bridge 104 further identifies a destination of the packet 410 and determines whether the destination is a recognized network peer. The satellite controlling bridge 104 may fail to identify network peer B 204 as a recognized network peer because prior to time t2, the forwarding table 134 of the satellite controlling bridge 104 does not include an entry corresponding to network peer B 204.

The satellite controlling bridge 104 may attempt to identify a destination of network data as a recognized downstream network peer. In that regard, the satellite controlling bridge 104 may determine whether the unrecognized destination of the packet 410 is a downstream peer of the satellite controlling bridge 104. As one example in FIG. 4, the satellite controlling bridge 104 floods downstream devices of the satellite controlling bridge 104 to determine whether the destination of the packet 410 is a downstream network peer. Here, network peer B 204 is a downstream network peer of the satellite controlling bridge 104. As such, network peer B 204 may respond to the flooding performed by the satellite controlling bridge 104, allowing the satellite controlling bridge 104 to identify network peer B 204 as a recognized downstream network peer. Thus, after time t2 and upon receiving a response from network peer B 204, the satellite controlling bridge 104 adds the peer B entry 422 into its forwarding table 134, in FIG. 4. Then, the satellite controlling bridge 104 may route the packet 410 to peer B 204 without forwarding the packet 410 to the controlling bridge 104.

The satellite controlling bridge 104 may determine that an unrecognized destination of network data is not a downstream network peer of the satellite controlling bridge 104. As one example, the satellite controlling bridge 104 may fail to receive a response from flooding downstream devices at time t2. The satellite controlling bridge 104 may then forward the network data with an unrecognized destination, e.g., an upstream destination such as the Upstream peer C 206, to the controlling bridge 102 for subsequent routing.

Figure 5:
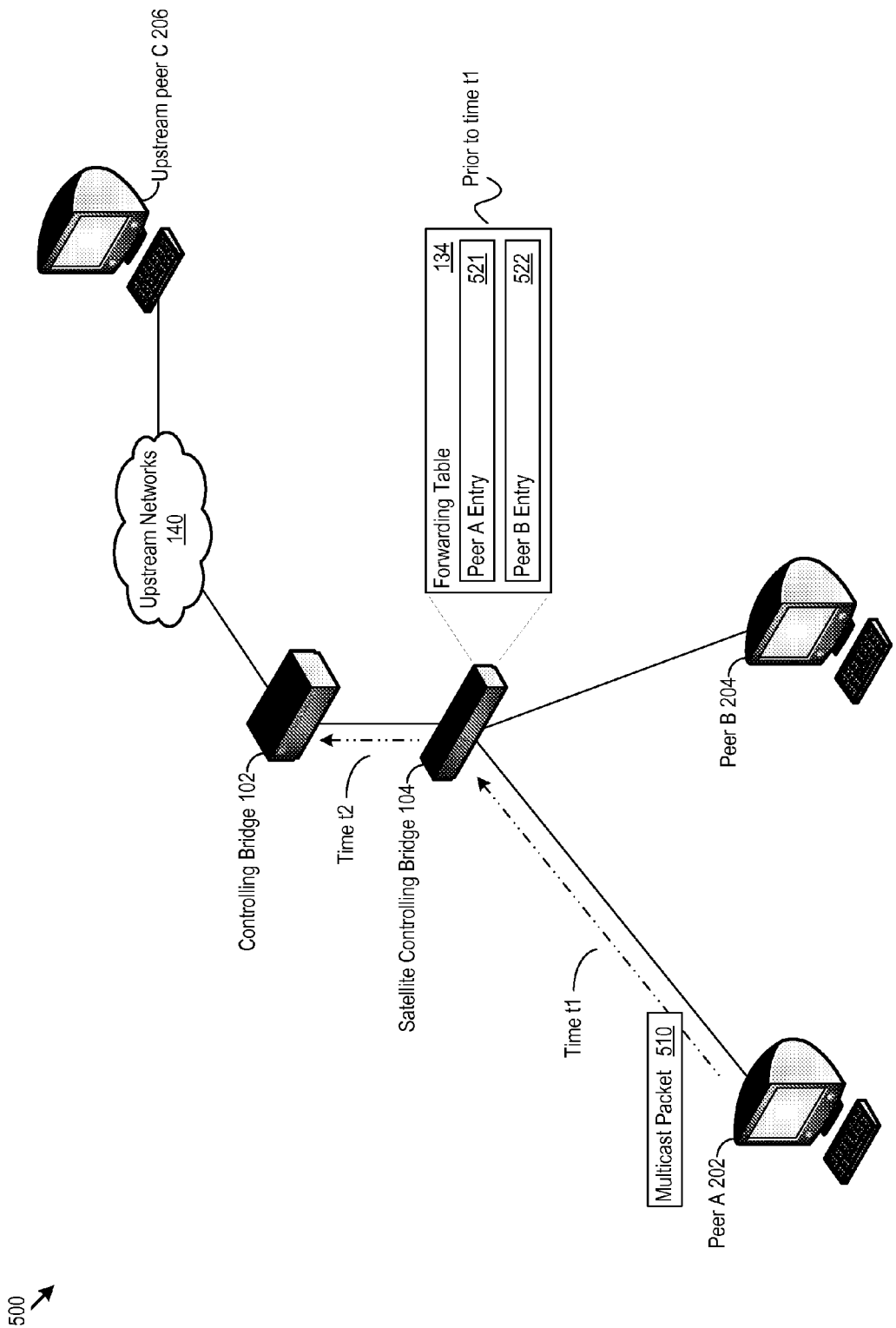
FIG. 5 shows an example of communicating data through a satellite controlling bridge architecture.

FIG. 5 shows an example 500 of communicating data through a satellite controlling bridge architecture. The example 500 illustrates one example of how the satellite controlling bridge 104 may selectively route network data from a downstream device according to a communication type associated with the network data. At a time prior to t1, the forwarding table 134 of the satellite controlling bridge 104 includes the peer A entry 521 corresponding to network peer A 202 and the peer B entry 522 corresponding to network peer B 204. Accordingly, the satellite controlling bridge 104 may identify network peer A 202 and network peer B 204 as recognized downstream network peers.

At time t1, network peer A 202 sends the multicast packet 510 to the satellite controlling bridge 104. Upon receiving the multicast packet 510, the satellite controlling bridge 104 may determine a communication type of the multicast packet 510. The satellite controlling bridge 104 may identify a communication type associated with the received network data based on network data destination(s), such as whether received network data comprises a unicast communication, a multicast communication, a broadcast communication, an anycast communication, or other communication types based on packet destinations. In the example 500, the satellite controlling bridge 104 determines that the multicast packet 510 is associated with a multicast communication and that one specified destination of the multicast packet 510 is network peer B 204.

The satellite controlling bridge 104 may forward network data with multiple destinations to the controlling bridge 102 even when one or more of the network data destinations is a recognized network peer of the satellite controlling bridge 104. In FIG. 5, the satellite controlling bridge 104 determines that multicast packet 510 includes multiple destinations, and in response, forwards the multicast packet 510 to the controlling bridge 102 for subsequent routing at time t2. The satellite controlling bridge 104 forwards the multicast packet 510 to the controlling bridge 104 even though one of the destinations of the multicast packet 510 is network peer B 204.

As one variation, the satellite controlling bridge 104 may process and route network data with multiple destinations when each of the multiple destinations is a recognized network peer of the satellite controlling bridge 104. For instance, in this variation, the satellite controlling bridge 104 may process and route the multicast packet 510 when each of the destinations of the multicast packet 510 are recognized downstream network of the satellite controlling bridge 104. This subsequent processing and routing may include replicating portions of the multicast packet 510 for delivery to multiple destinations, appending routing information to the multicast packet 510 and replicated portions, and routing the processed multicast packet 510 and replications. As another variation, the satellite controlling bridge 104 may process and route the multicast packet 510 for the multicast destinations that are recognized network peers of the satellite controlling bridge 104 and forward the multicast packet 510 to the controlling bridge 102 for routing of the multicast destinations that are not recognized network peers of the satellite controlling bridge 104. In this case, the satellite controlling bridge 104 may provide a multicast routing indication to the controlling bridge 102 specifying which of the multicast destinations the satellite controlling bridge 104 has routed network data to, which multicast destinations the satellite controlling bridge 104 did not route network data to, or both. The satellite controlling bridge 104 may perform any of the above routing for a broadcast communication, an anycast communication, or other multi-destination communications as well.

Additionally or alternatively to selectively routing network data, e.g., a packet, based on a number of destinations of the network data, the satellite controlling bridge 104 may selectively route network data based on any number of network data characteristics, including without limitation, QoS, packet size, communication protocol, latency, security constraints or requirements, and more.

Figure 6:
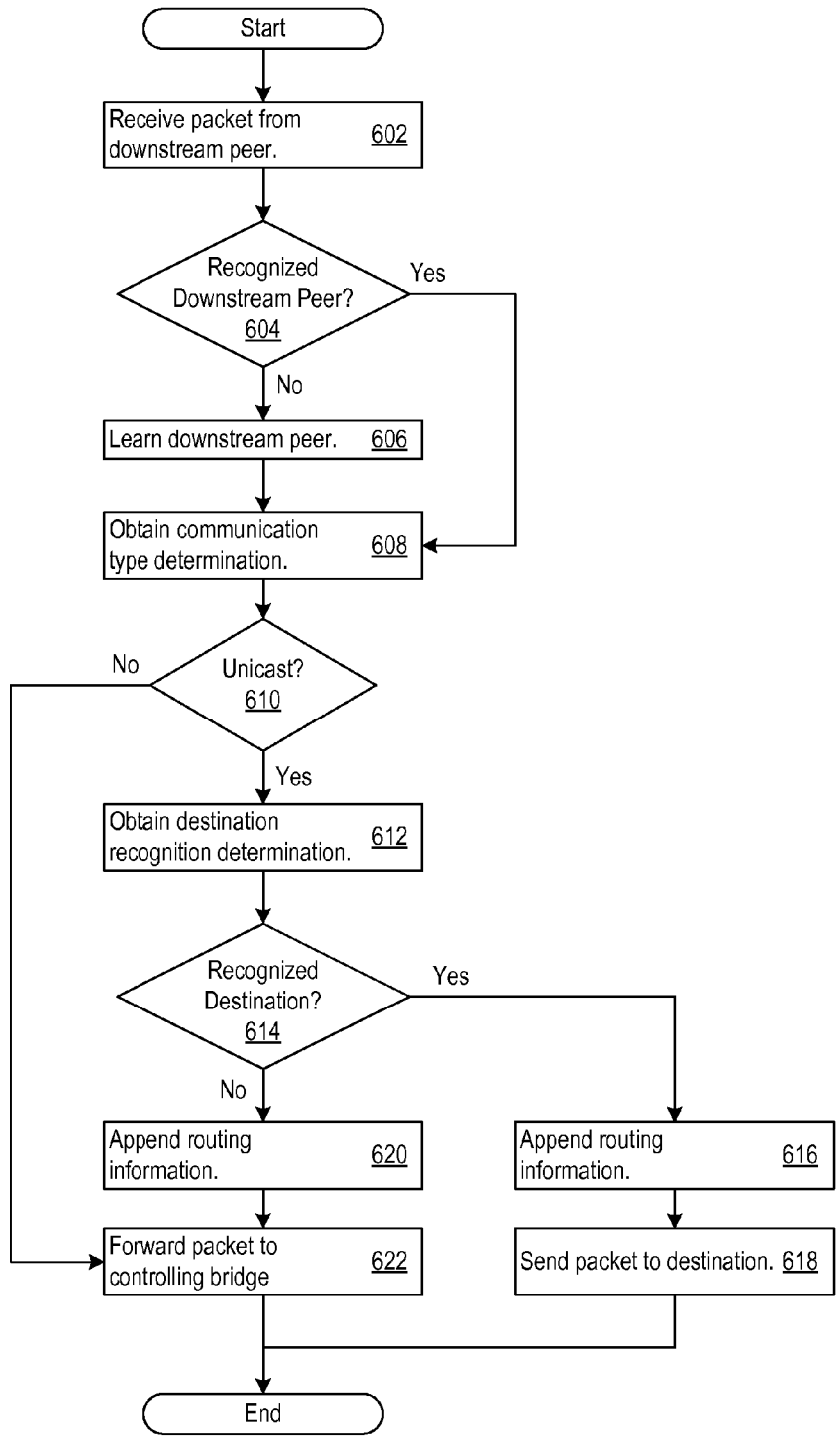
FIG. 6 shows an example of logic that may be implemented as hardware, software, or both.

FIG. 6 shows an example of logic 600 that may be implemented as hardware, software, or both. For instance, the satellite controlling bridge 104 may implement the logic 600 in software as the satellite controlling bridge instructions 132.

The satellite controlling bridge 104 receives a packet sent from a downstream peer (602). The satellite controlling bridge 104 may receive the packet directly from the downstream peer or from an intermediate network device, e.g., a transit port extender or an access port extender. The satellite controlling bridge 104 may identify the downstream peer by inspecting a source field in the packet, and determine whether the downstream peer is recognized by the satellite controlling bridge 104 (604). For example, the satellite controlling bridge 104 may perform a lookup in a forwarding table 134. When the satellite controlling bridge 104 does not recognized the downstream peer that sent the packet, the satellite controlling bridge 104 may learn the downstream peer (606). Put another way, the satellite controlling bridge 104 may identify the downstream peer as a recognized network peer, e.g., by adding an entry associated with the downstream peer to the forwarding table 134. The entry may include any identifying information with respect to the downstream peer or a communication path between the downstream peer and the satellite controlling bridge 104 as discussed above. In one variation, the satellite controlling bridge 104 learns network peers downstream to the satellite controlling bridge 104 and does not learn network peers upstream to the satellite controlling bridge 104. When the satellite controlling bridge 104 determines the downstream peer is already recognized, the satellite controlling bridge 104 may forego learning the downstream peer. As one variation, the satellite controlling bridge 104 may update the downstream peer's entry in the forwarding table 134, for instance to update a timestamp indicating when data was last received and/or sent to the downstream peer.

The satellite controlling bridge 104 may obtain a communication type determination with respect to the packet sent by the downstream peer (608). As one example, the satellite controlling bridge 104 may determine a communication type determination that specifies whether the packet comprises a single destination communication, e.g., unicast communication, or a multiple destination communication, e.g., multicast, broadcast, anycast, or other multi-destination communication (610). When the packet comprises a single destination communication, the satellite controlling bridge 104 obtains a destination recognition determination (612) in any of the ways discussed above. The satellite controlling bridge 104 may determine the destination of the packet by inspecting a corresponding header field. Then, the satellite controlling bridge 104 may determine whether the destination is a recognized network peer of the satellite controlling bridge (614). In that regard, the satellite controlling bridge 104 may, for example, perform a lookup in the forwarding table 134 according to the determined destination. When an entry corresponding to the destination exists in the forwarding table 134, the satellite controlling bridge may identify the destination as a recognized network peer. When the destination is a recognized peer of the satellite controlling bridge 104, the satellite controlling bridge 104 may append additional data, e.g., routing information, to the packet (616). The routing information may include routing information specifying a destination device, one or more intermediate network devices between the satellite controlling bridge 104 and the destination, one or more ports associated with the destination device and/or intermediate network devices, or any other information with respect to routing the packet to the destination. The routing information may include any of the information included in the IEEE 802.1 Qbh E-Tag, for example. Then, the satellite controlling bridge 104 sends the packet to the destination, e.g., the recognized network peer (618).

When the destination of the packet is not a recognized network peer, the satellite controlling bridge 104 may append additional information to the packet, such as routing information (620). The routing information may specify one or more source devices, intermediate network devices (e.g., port extenders), the satellite controlling bridge 104 itself, ports associated with the source, intermediate network devices and/or satellite controlling bridge 104, or other data with respect to how the packet was routed to the satellite controlling bridge 104. Then, the satellite controlling bridge 104 may forward the packet to an upstream controlling bridge 102 for delivery to the destination (622). The satellite controlling bridge 104 may also forward the packet to the upstream controlling bridge 102 for processing and routing (622) when the packet is a multi-destination packet.

Figure 7:
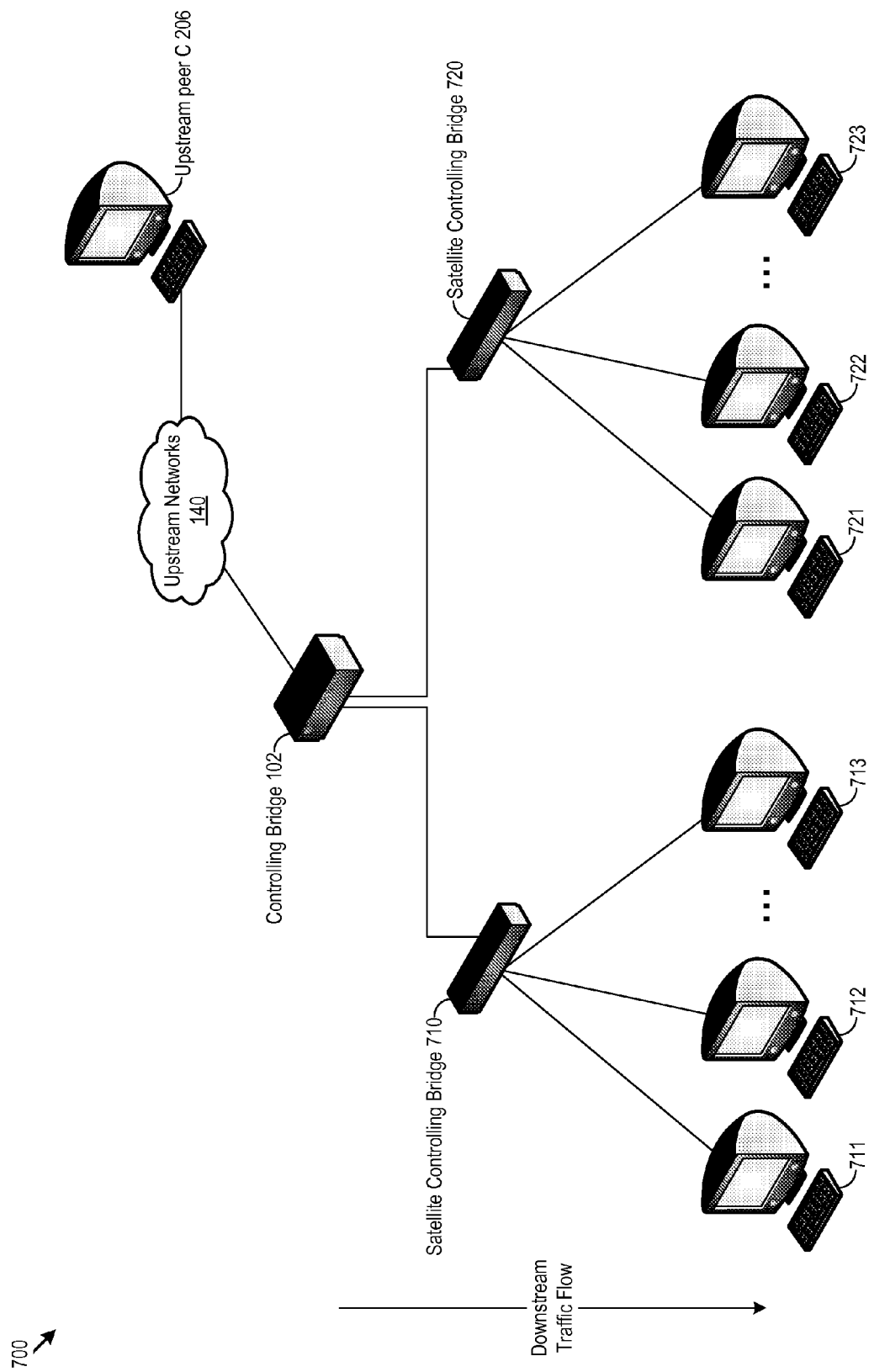
FIG. 7 shows an example of a communication network that includes a satellite controlling bridge architecture with multiple satellite controlling bridges.

FIG. 7 shows an example of a communication network 700 that includes a satellite controlling bridge architecture with multiple satellite controlling bridges. In the example in FIG. 7, the communication network 700 includes the satellite controlling bridge 710, which is communicatively link to a first set of downstream network peers including those labeled as 711, 712, and 713. The communication network 700 also includes the satellite controlling bridge 720, which is communicatively link to a second set of downstream network peers, including those labeled as 721, 722, and 723. Both the satellite controlling bridges 710 and 720 are downstream to and communicatively linked with the controlling bridge 102. The controlling bridge 102 is linked to upstream networks 140 and upstream peer C 206.

In FIG. 7, a network peer 711, 712, 713 in the communication network 700 may be considered a downstream network peer to a first satellite controlling bridge 710 but not a second satellite controlling bridge 720. The satellite controlling bridge 710 may identify network peer 711, 712, or 713 as a downstream network peer because the communication link from the satellite controlling bridge 710 to network peers 711, 712, and/or 713 only flows downstream. To further illustrate, the satellite controlling bridge 710 may not identify network peers 721, 722, and 723 as downstream network peers because the communication link between the satellite controlling bridge 710 to network peers 721, 722, 723 flows upstream through the controlling bridge 102.

A satellite controlling bridge may identify recognized network peers independently from a different satellite controlling bridge. Satellite controlling bridges in a communication network 700 may maintain their own forwarding table 134 identifying recognized network peers. For example, in FIG. 7, the satellite controlling bridge 710 may learn and identify network peers downstream to the satellite controlling bridge 710 as recognized network peers whereas the satellite controlling bridge 720 would not identify and learn network peers 711, 712 and 713 as recognized network peers. In this example, when network traffic is exchanged between network peer 711 and network peer 721, the network traffic may be forwarded to the controlling bridge 102 for routing by the satellite controlling bridge 710, the satellite controlling bridge 720, or both. In another example, the satellite controlling bridge 720 may route network traffic exchanged between network peers 722 and 723 without forwarding the network traffic to the controlling bridge 102.

As described above, a satellite controlling bridge architecture may include one or more satellite controlling bridges downstream to a master controlling bridge, e.g., the controlling bridge 102. A satellite controlling bridge may selectively route network data according to a communication type of the network data, whether the destination of the network data is a recognized network peer of the satellite controlling bridge, or according to other criteria. The satellite controlling bridge routes "east-west" network traffic between downstream network peers of the satellite controlling bridge, thus reducing processing and routing overhead of the master controlling bridge. Similarly, by routing traffic exchanged between downstream network peers, the satellite controlling bridge may reduce the table size of a forwarding table for the master controlling bridge. The satellite controlling bridge architecture allows for a flexible and efficient distributed architecture, while maintaining port extender features in a communication network or segment.

The methods, devices, systems, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, it will be apparent to those of ordinary skill in the art that many more embodiments and implementations are possible. Accordingly, the methods, systems, device, and logic described above are not to be restricted except in light of the attached claims and their equivalents.

What is claimed is:

1. A method comprising:
   in a port extender communicatively linked to a controlling bridge:
   receiving network data from a local network peer downstream to the port extender;
   determining whether a destination of the network data is a recognized downstream network peer of the port extender;
   in response to receiving the network data from the local network peer, identifying the local network peer as a respective recognized downstream network peer of the port extender, by adding, with the port extender, an entry into a forwarding table, the entry comprising an identification of the local network peer, a source port extender, a source port of the source port extender, or any combination thereof; and
   selectively routing the network data according to whether the destination of the network data is determined to be the recognized downstream network peer of the port extender.

2. The method of claim 1, where selectively routing comprises:
   sending the network data to the recognized downstream network peer when the destination of the network data is determined to be the recognized downstream network peer of the port extender, without forwarding the network data to the controlling bridge; and
   forwarding the network data to the controlling bridge for routing to the destination when the destination of the network data is determined not to be the recognized downstream network peer of the port extender.

3. The method of claim 1, further comprising:
   when the destination of the network data is determined not to be the recognized downstream network peer of the port extender:
   adding routing information to the network data before forwarding the network data to the controlling bridge, where the routing information identifies a source port extender, a source port of the source port extender, or both.

4. The method of claim 1, further comprising:
   maintaining a forwarding table that specifies recognized downstream network peers of the port extender.

5. The method of claim 4, where determining whether a destination of the network data is the recognized downstream network peer of the port extender comprises accessing the forwarding table to determine if an entry associated with the destination exists in the forwarding table.

6. The method of claim 4, where maintaining comprises removing a particular recognized network peer from the forwarding table when the port extender does not receive traffic from the particular recognized network peer for longer than a determined time threshold.

7. The method of claim 1, comprising:
   when the destination of the network data is determined to be the recognized downstream network peer of the port extender:
   adding forwarding information associated with the recognized downstream network peer to the network data, where the forwarding information comprises a destination port extender, destination port of the destination port extender, or both; and
   sending the network data to the recognized downstream network peer according to the forwarding information.

8. The method of claim 1, further comprising obtaining a communication type determination from the network data specifying whether the network data comprises a unicast communication; selectively appending additional information to the network data in accordance with the communication type determination, wherein the selective routing step comprises selectively routing the network data with or without the appended additional information according to the communication type determination, whether the destination of the network data is determined to be the recognized downstream network peer, or both.

9. A device comprising:
   a memory storing:
   satellite controlling bridge instructions; and
   a processor included in a port extender device and in communication with the memory, where the processor, when executing the satellite controlling bridge instructions, is operable to:
   receive network data from a source downstream network device;
   obtain a communication type determination specifying whether the network data comprises a unicast communication;
   add an entry into a forwarding table stored in the memory in response to recognition that the source downstream network device is a downstream network peer of the port extender and confirmation that the source downstream network device is not already represented in the forwarding table, the entry comprising an identification of the source downstream network device, a source port extender, a source port of the source port extender, or any combination thereof;
   obtain a destination recognition determination specifying whether a destination of the network data is a recognized downstream network peer;
   selectively append additional information to the network data in accordance with the communication type determination; and
   selectively route the network data with or without the appended additional information according to the communication type determination, destination recognition determination, or both.

10. The device of claim 9, where when the communication type determination specifies the network data does not comprise a unicast communication, the processor is operable to selectively route the network data by:
    forwarding the network data to an upstream controlling bridge.

11. The device of claim 9, where when the communication type determination specifies the network data comprises a unicast communication, the processor is operable to selectively route the network data by:

when the destination recognition determination specifies the destination of the network data is not the recognized downstream network peer:
  forwarding the network data to the upstream controlling bridge for routing to the destination; and
when the destination recognition determination specifies the destination of the network data is the recognized downstream network peer:
  sending the network data to the recognized downstream network peer without forwarding the data to the upstream controlling bridge.

12. The device of claim 9, where the processor is operable to obtain a destination recognition determination by identifying whether an entry corresponding to the destination is stored in the forwarding table.

13. The device of claim 12, where the processor is further operable to:
  remove an entry from the forwarding table when traffic is not received from a particular recognized network peer associated with the entry for longer than a determined time threshold.

14. The device of claim 9, wherein the additional information comprises routing information.

15. The device of claim 14, wherein the routing information includes specification of a destination device or an intermediate network device.

16. The device of claim 14, wherein the routing information includes specification of one or more ports associated with a destination device or an intermediate network device.

17. The method of claim 9, further comprising flooding the network data to downstream devices when the communication type is a multicast, and adding an additional downstream device to the forwarding table when a response to the flooding is received from the additional downstream device.

18. A system comprising:
  a satellite controlling bridge in communication with an upstream master controlling bridge, a first downstream network device, and a second downstream network device, the satellite controlling bridge operable to:
  receive initial network traffic from the first downstream network device for delivery to the second downstream network device, the initial network traffic being a first network traffic ever received from the first downstream network device;
  identify the first downstream network device as a recognized downstream network device in response to receipt of the initial network traffic;
  store an entry in a forwarding table upon receipt of the initial network traffic and identification of the first downstream network device as the recognized downstream network device; and
  after the first downstream network device is identified as recognized downstream network device and represented in the forwarding table:
    receive subsequent network traffic from the first downstream device for delivery to the second downstream network device; and
    route the subsequent network traffic for delivery to the second downstream device without forwarding the subsequent network traffic to the master controlling bridge.

19. The system of claim 18, where the satellite controlling bridge is operable to identify the first downstream network device as a recognized downstream network device in response to receiving network data from the upstream master controlling bridge for delivery to the first downstream network device.

20. The system of claim 18, where the satellite controlling bridge is operable to maintain the forwarding table by:
  removing a particular recognized network peer from the forwarding table when the satellite controlling bridge does not receive network traffic from the particular recognized network peer for longer than a determined time threshold.

* * * * *